(12) United States Patent
Georgi et al.

(10) Patent No.: US 9,140,085 B2
(45) Date of Patent: Sep. 22, 2015

(54) APPARATUS AND METHOD FOR POSITIONING AND ORIENTING A BOREHOLE TOOL

(75) Inventors: Daniel T. Georgi, Houston, TX (US); Martin P. Coronado, Cypress, TX (US); Carl M. Edwards, Katy, TX (US); Antonius M. Loermans, Dhahran (SA)

(73) Assignee: Baker Hughes Incorporated, Houston, TX (US)

( * ) Notice: Subject to any disclaimer, the term of this patent is extended or adjusted under 35 U.S.C. 154(b) by 861 days.

(21) Appl. No.: 13/396,134

(22) Filed: Feb. 14, 2012

(65) Prior Publication Data

US 2013/0206397 A1 Aug. 15, 2013

(51) Int. Cl.
| | |
|---|---|
| *E21B 23/00* | (2006.01) |
| *E21B 47/00* | (2012.01) |
| *E21B 23/02* | (2006.01) |
| *E21B 23/03* | (2006.01) |
| *G01V 11/00* | (2006.01) |
| *E21B 47/09* | (2012.01) |

(52) U.S. Cl.
CPC .............. *E21B 23/02* (2013.01); *E21B 23/03* (2013.01); *E21B 47/09* (2013.01); *G01V 11/005* (2013.01)

(58) Field of Classification Search
CPC ......... E21B 23/02; E21B 23/03; E21B 47/09; G01V 11/005
See application file for complete search history.

(56) References Cited

U.S. PATENT DOCUMENTS

| | | | |
|---|---|---|---|
| 3,507,329 A | 4/1970 | Stone, Jr. | |
| 4,121,657 A | 10/1978 | McClure | |
| 4,295,528 A | 10/1981 | Carmody | |
| 4,583,591 A | 4/1986 | Krause, Jr. et al. | |
| 4,610,309 A | 9/1986 | O'Brien et al. | |
| 4,686,653 A | 8/1987 | Staron et al. | |
| 4,745,974 A | 5/1988 | Higgins | |
| 4,823,872 A | 4/1989 | Hopmann | |
| 4,883,121 A | 11/1989 | Zwart | |
| 5,064,006 A * | 11/1991 | Waters et al. | 175/45 |
| 5,947,198 A | 9/1999 | McKee et al. | |
| 5,996,711 A | 12/1999 | Ohmer | |
| 6,012,516 A * | 1/2000 | Brunet | 166/50 |
| 6,019,182 A | 2/2000 | Rountree et al. | |
| 6,050,341 A | 4/2000 | Metcalf | |
| 6,152,219 A | 11/2000 | Vick, Jr. et al. | |

(Continued)

OTHER PUBLICATIONS

Notification of Transmittal of the International Search Report and the Written Opinion of the International Searching Authority, or the Declaration; PCT/US2013/024817; May 14, 2013.

(Continued)

*Primary Examiner* — Jennifer H Gay
*Assistant Examiner* — George Gray
(74) *Attorney, Agent, or Firm* — Cantor Colburn LLP (57) ABSTRACT

A downhole positioning apparatus includes: a carrier configured to be disposed in a borehole in an earth formation, the carrier including at least one measurement tool and an extendable member configured to be actuated between a first position in which the extendable member is disposed at the carrier and a second position in which the member is extended from an outer surface of the carrier; and a receiving element fixedly disposed at a borehole casing, the receiving element configured to receive the elongated member when the member is in the second position and guide the carrier to a selected orientation as the carrier is moved axially through the borehole.

20 Claims, 5 Drawing Sheets

(56) References Cited

U.S. PATENT DOCUMENTS

| | | | |
|---|---|---|---|
| 6,202,746 B1* | 3/2001 | Vandenberg et al. | 166/117.6 |
| 6,315,075 B1 | 11/2001 | Nakajima | |
| 6,419,012 B1 | 7/2002 | George et al. | |
| 6,497,288 B2 | 12/2002 | George et al. | |
| 6,510,898 B1 | 1/2003 | Buytaert | |
| 6,588,542 B2 | 7/2003 | Nakajima et al. | |
| 6,615,933 B1 | 9/2003 | Eddison | |
| 6,820,697 B1 | 11/2004 | Churchill | |
| 7,040,415 B2 | 5/2006 | Boyle et al. | |
| 7,252,150 B2 | 8/2007 | Downie et al. | |
| 7,546,871 B2 | 6/2009 | Moyes | |
| 7,654,334 B2 | 2/2010 | Manson | |
| 7,725,263 B2 | 5/2010 | Sugiura | |
| 7,819,186 B2 | 10/2010 | Moyes | |
| 7,975,767 B2 | 7/2011 | Purkis | |
| 2010/0195436 A1* | 8/2010 | Kamata et al. | 367/25 |
| 2010/0286967 A1 | 11/2010 | Vasilevskiy et al. | |
| 2011/0185806 A1 | 8/2011 | Pfutzner | |

OTHER PUBLICATIONS

Brady, et al. "Surface-Gravity Monitoring of the Gas Cap Water Injection Project Prudhoe Bay, Alaska". SPE< BP Exploration Inc. SPE 87662. Dec. 5, 2003. Feb. 2004 SPE Reservoir Evaluation & Engineering. pp. 59-67.

Eiken, et al. "Gravity Monitoring of offshore gas reservoirs". SEG 2000 Expanded Abstracts. 4 pages.

Johann, et al "4D Seismic in Brazil: Experiences in Reservoir Monitoring". OTC 18400. 2006 Offshore Technology conference held in Houston, TX USA May 1-4, 2006. 21 pages.

Oliveira. "The Marlim Field: Incorporating 4D Seismic in Reservoir-Management Decisions". Distinguished Author Series. JPT. Apr. 2008. pp. 52-53 and 107-110.

Landa, et al. "Joint Inversion of 4D Seismic and Production Data". SPE 146771. SPE Annual Technical Conference and Exhibition held in Denver, Colorado, USA Oct. 30-Nov. 2, 2011. 17 pages.

* cited by examiner

APPARATUS AND METHOD FOR POSITIONING AND ORIENTING A BOREHOLE TOOL

BACKGROUND

Efficient production of hydrocarbons generally requires precise measurements of location and movement of fluids and fluid fronts in formation reservoirs. In the hydrocarbon drilling and recovery industry, many types of measurements are made to quantify fluid saturations and distribution of water, oil and gas in a reservoir. The tracking of saturation fronts is essential to the design and management of reservoir depletion strategies as well as prediction of field performance. However, determining the movement of reservoir fluids remains challenging and is addressed mainly with repeated surface geophysical measurements, including surface seismic and surface gravity data.

One challenge with using surface geophysical data is that measurement locations are far removed from the reservoir and that details of the fluid movement are smoothed by the distance from the surface observation to the fluid-fronts of interest in the reservoir. Downhole gravity measurements reduce the distance from the reservoir, but present additional challenges as measurement tools should be positioned in the same location within a well for repeat measurements.

SUMMARY

A downhole positioning apparatus includes: a carrier configured to be disposed in a borehole in an earth formation, the carrier including at least one directional sensing tool and an extendable member configured to be actuated between a first position in which the extendable member is disposed at the carrier and a second position in which the member is radially extended from an outer surface of the carrier; and a receiving element fixedly disposed at a borehole casing, the receiving element configured to receive the elongated member when the member is in the second position and rotate the carrier to a selected orientation as the carrier is moved axially through the borehole.

A method of positioning a downhole carrier includes: disposing a carrier in a borehole in an earth formation, the carrier including at least one measurement tool and an extendable member; actuating the extendable member from a first position in which the extendable member is disposed at the carrier to a second position in which the member is extended from an outer surface of the carrier; engaging the extendable member with a receiving element fixedly disposed at a borehole casing, wherein engaging includes extending a portion of the extendable member into the receiving element; and advancing the carrier along the borehole and moving the extendable member along the receiving element to a selected location in the receiving element corresponding to a selected depth and orientation of the carrier, the receiving element guiding the carrier to the selected orientation as the carrier is advanced and the extendable member is moved along the receiving element.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
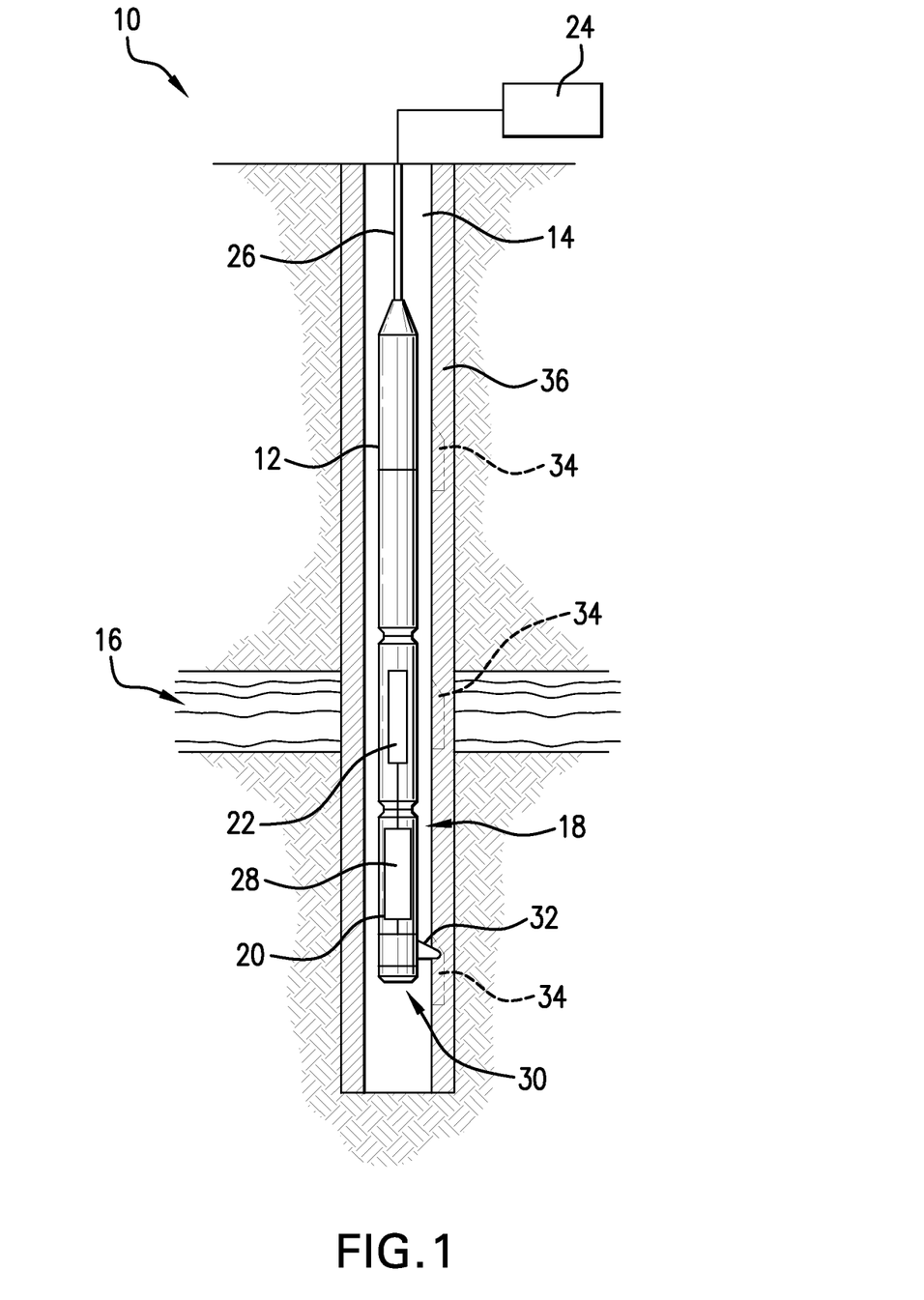
FIG. 1 illustrates an exemplary embodiment of a well logging production and/or drilling system in a borehole penetrating the earth.

Referring to FIG. 1, an exemplary embodiment of a well logging, production and/or drilling system 10 includes a borehole string 12 that is shown disposed in a borehole 14 that penetrates at least one earth formation 16 during a drilling, well logging and/or hydrocarbon production operation. In one embodiment, the string 12 includes one or more pipe sections or coiled tubing. The string 12 may be lowered into the borehole 14 via, for example, a wireline or by lowering multiple pipe sections or segments of a tool string. In one embodiment, the system 10 also includes a bottomhole assembly (BHA) 18. The BHA 18, or other portion of the borehole string 12, includes a measurement assembly such as a downhole tool 20 configured to estimate at least one property of the formation 14 and/or the borehole 12.

The tool 20 is connected to suitable electronics for receiving sensor measurements, storing or transmitting data, analyzing data, controlling the tool and/or performing other functions. Such electronics may be incorporated downhole in, e.g., an electronics unit 22 incorporated as part of the tool 20 or other component of the string 12, and/or a surface processing unit 24. In one embodiment, the electronics unit 22 and/or the surface processing unit 24 includes components as necessary to provide for storing and/or processing data collected from the tool 20. Exemplary components include, without limitation, at least one processor, storage, memory, input devices, output devices and the like. In one embodiment, the electronics unit 22 and/or the surface processing unit 24 is configured as a control unit to control the operation of the tool 20, sensors and/or other components of the system 10. The BHA 18 and/or the tool 20 incorporates any of various transmission media and connections, such as a wireline 26 shown in FIG. 1, as well as suitable wired connections, fiber optic connections, wireless connections and mud pulse telemetry.

The downhole tool 20 includes one or more sensors for measuring parameters of the formation and/or borehole. For example, the tool 20 includes one or more gravity sensors or meters 28. The gravity meters include, in one embodiment, a plurality of accelerometers disposed about a three-dimensional structure (i.e., collocated). Although embodiments herein are described in conjunction with gravity sensors, other sensors or measurement devices may be used. For example, directional sensors may be used, such as seismic or acoustic sensors. Other examples include directional resistivity devices such as those utilizing transient electromagnetic (EM) technology. The systems and methods described herein can be used to position a tool relative to an EM transparent window (that is, e.g., part of a borehole completion), as well as allow for repeated azimuthal orientation for various measurements.

In one embodiment, the gravity meter 28 is a 3-component (3-axis) gravity meter deployed via, e.g., an electric wireline. An exemplary gravity meter tool 20, including one or more individual sensors, is approximately 1 and 11/16 inches or 2.25 inches in diameter and is both powered and controlled from the surface via a single conductor electric wireline 26.

Figure 3:
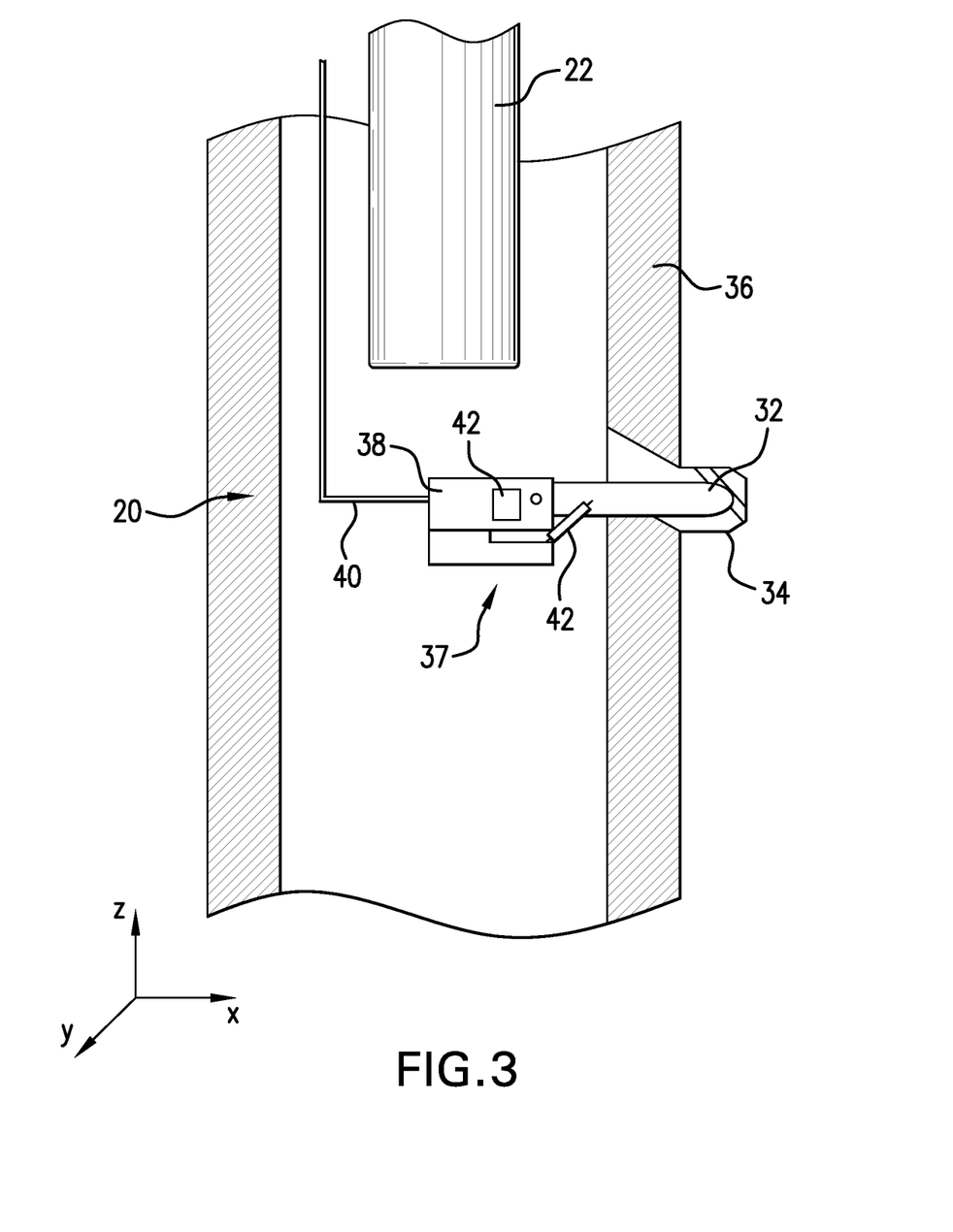
FIG. 3 illustrates the tool of FIG. 2, including the positioning member disposed at a second position.

A positioning assembly 30 is shown in FIG. 1 that can be used to accurately position the tool 20 in an axial direction (e.g., at a desired depth) and orient the tool 20 to a desired orientation, e.g., in a desired horizontal or radial direction. The assembly 30 can act as a selective lock mechanism to anchor and orient the tool 20 and provide both vertical and horizontal or azimuthal orientation of the tool 20 which allows one to interpret changes in various directional components of gravity. An exemplary coordinate system is shown in FIG. 3, which includes an Z-axis that corresponds to a vertical direction, the direction of gravity and/or the borehole axis. An X-axis and a Y-axis are disposed in a plane that is perpendicular to the Z-axis. A three-component gravity meter can be used to measure the vertical component of gravity (gz) and horizontal components (gx, gy) of gravity. Other measures of position can also be used, such as an azimuth angle and/or an inclination angle.

Referring again to FIG. 1, the position assembly 30 includes an extendable member 32 disposed within the tool 20 and configured to be actuated from a first position, in which the member is disposed within the tool 20 (or otherwise not extending beyond the surface of the tool 20) and one or more second or actuated positions. A receiving element 34 is fixedly disposed in the borehole 12 at a desired location at which gravity measurements are to be taken. In one embodiment, the receiving element 34 is disposed at a borehole casing 36. The receiving element 34 is configured to receive the extendable member 32 when the member 32 is in one or more actuated positions and move the tool 20 both axially and rotationally toward a selected location and orientation as the tool 20 is moved axially through the borehole 14. Although described as part of the casing 36, the receiving element 34 is not so limited, and can be disposed at any component, such as a sleeve or collar, that is capable of being deployed in a fixed position within the borehole 14. In addition, the casing or sleeve may be made from any suitable material, such as a metallic material (e.g., steel), a conductive material or a non-conductive sleeve such as fiberglass or PEET for, e.g., resistivity or transient electromagnetic measurements.

In one embodiment, as shown in FIG. 1, the position assembly 30 includes a plurality of receiving elements 34 disposed axially along the casing 36. Each receiving element is configured to position the tool 20 at locations at which gravity measurements are to be taken. The tool 20 can be positioned at each element and held in place while measurements are taken, and then released and moved to the next element 34. In one embodiment, multiple tools 20 or sensors 22 can be deployed in the borehole and positioned at selected receiving elements 34.

Figure 2:
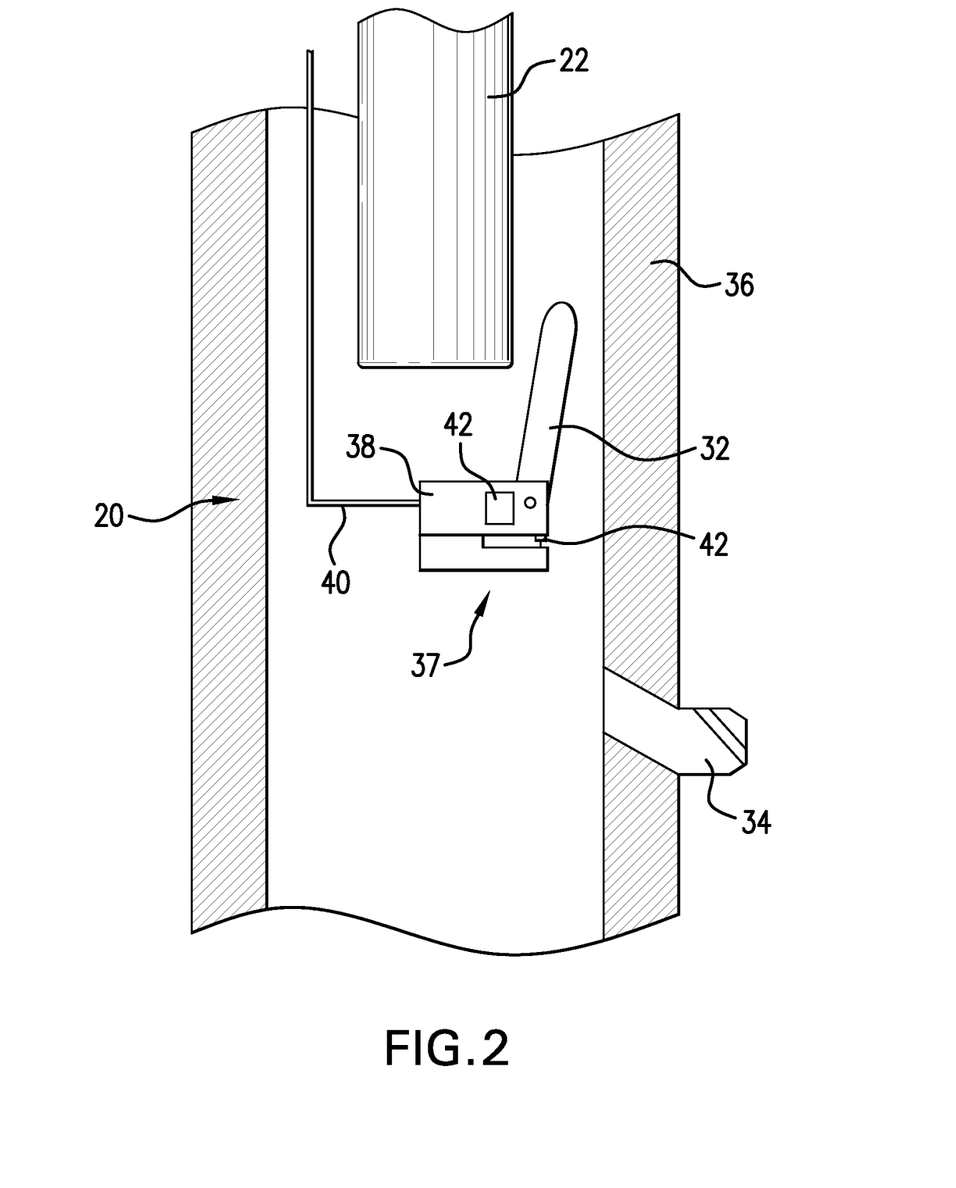
FIG. 2 illustrates an exemplary embodiment of a tool for measuring properties of an earth formation, including a positioning member disposed at a first position.

Referring to FIGS. 2 and 3, the tool 20 includes a positioning unit 37 including an actuator 38 operably connected to the member 32 and in communication with the surface processing unit 24, downhole electronics 22 or other control device via a suitable connection 40, such as a wire or fiber optic connection. The control device can be controlled via a processor and automatically operated or controlled by a human. The actuator 38, e.g., an electro-mechanical actuator, can be controlled via a signal transmitted via any suitable connection, such as a wire or optical fiber (e.g., via wireline) or a wireless connection. The configuration and type of the actuator 38 and extendable member 32 described herein are exemplary. Any suitable actuating techniques can be used, such as electrical, hydraulic, piezoelectric and others. Suitable extendable members can include, e.g., electrically or hydraulically actuated pistons, valves and others.

The positioning unit 37 can be integral to the tool 20 or can be a separate unit that is attached, e.g., with a common field joint, to the tool 20. For example, the unit 37 can be placed at the bottom, top or in the middle of the tool 20. The tool 20 may include additional locking mechanisms at, e.g., the top and/or bottom of the tool 20 to lock the tool 20 relative to other components of the string 12 to minimize movements during measurements.

As shown in FIGS. 2 and 3, the extendable member 32 is shaped or otherwise configured to engage with the receiving element 34, which forms a profile or cross-sectional shape in the casing 36 (or other sheath or collar). The extendable member 32 is shaped so that the member, when in one or more actuated positions, is held in a path defined by the receiving element 34. For example, the receiving element 34 shown in FIGS. 2 and 3 is a groove extending radially into the casing 36 and forming a path along the casing that has an axial or Z-axis component and a horizontal or circumferential component. The groove path forces the member 32 to move axially and cause the tool 20 to move axially and rotate toward a desired orientation. The member 32 can be configured as moveable teeth, dogs or keys that engage the groove when actuated.

In one embodiment, shown in FIG. 2, the extendable member 32 is held in the first position via a biasing device, such as a spring 40. Upon actuation, as shown in FIG. 3, the extendable member 32 is rotated or otherwise radially extended to the second actuated position by the actuator 38, in which the extendable member 32 is partially disposed in the a groove in the casing 36. A releasable locking mechanism 43 may be included to lock the member 32 in the actuated position.

Figure 4:
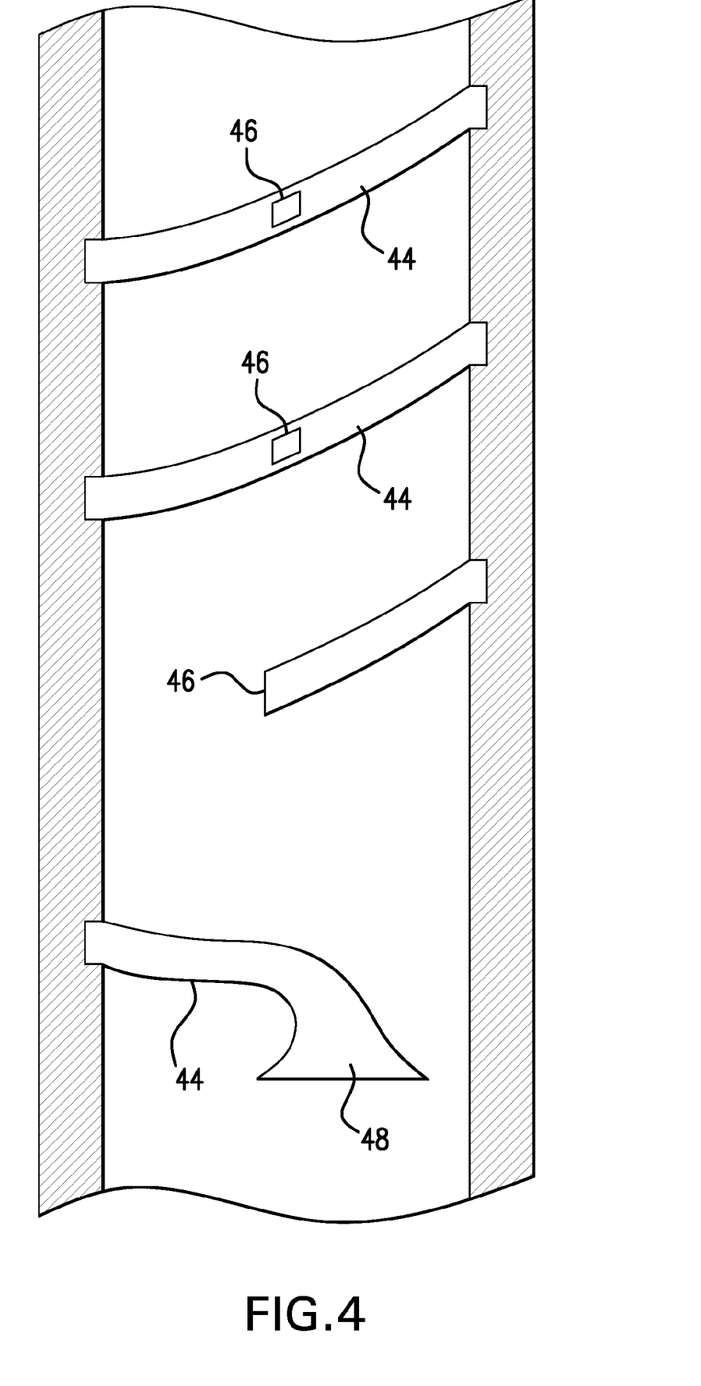
FIG. 4 illustrates embodiment of a receiving element configured to engage the tool of FIGS. 2 and 3.

One embodiment of a cross-section of the receiving element 34 is shown in FIG. 4. In this embodiment, the receiving element includes one or more grooves 44 recessed into the casing 36 and extending along an interior surface of the casing 36 (or other fixed structure in the borehole). Each groove 44 includes a number of seats 46 disposed at a fixed location at or in the groove 44 corresponding to a desired position and orientation of the tool 20. The extendable member 32 engages the seat profile to ensure that the logging tool 20 is positioned at fixed locations (e.g., measured depth, and x and y-azimuths) along the well.

The groove 44 is configured to rotate the downhole tool 20 when the extendable member 32 is in an actuated position to a fixed axial position and rotational orientation. In one embodiment, each groove 44 (or other receiving element 34) includes one or more seats 46 at selected locations along the groove to impede the progress of the member 32 along the groove 44 and define stop or rest positions. Each seat 46 is located at a selected position corresponding to a desired tool depth and orientation, so that the tool 20 can be accurately and repeatedly positioned. The seat 46 can have any suitable configuration, such as a raised profile within the groove 44, a block or other structure disposed in the groove 44 or any type of obstruction or mechanism to stop the progress of the member 32 along the groove 44.

For example, the seat 44 can be defined by simply ending the groove 44 at a selected position to cause the tool 20 to stop descending and rotating. In another embodiment, the groove 44 includes one or more seats 46 defining stop positions disposed at one or more locations along the groove 44. These positions can be created by any suitably profiled component fixedly disposed in the groove that causes the extendable member to stop.

In one example, the actuator 38 can be configured to rotate, extend or otherwise move the member 32 to multiple positions, e.g., a partially extended position and a fully extended position. The partially extended position can cause the member 32 to extend far enough so that the member 32 extends into the groove 44 but does not engage the seat 46, and the fully extended position can cause the member 32 to extend far enough into the groove 44 so that the member 32 contacts the seat 46 when the member is moved to the seat location. After measurements are taken at one stop position, the member 32 can be refracted to the partially extended position to allow the member 32 to advance further along the groove 44 past the corresponding seat 46 and then subsequently fully extended so that the member 32 engages the next seat 46 at the following stop position. In one embodiment, the receiving element 34 is configured to allow the tool 20 to be disposed and lowered at different locations along the groove. For example, the groove 44 may include seats having different sizes or shapes, and the member 32 may be configured to be actuated to multiple positions at which different seat types or sizes can be engaged.

In one embodiment, the seats 46 are configured as holes in the groove 44 or other profiles or locations at which the groove depth is increased. In this embodiment, the member 32 may be biased radially outwardly so that the member 32 engages the seat 44 when the member is located at the seat position. The member 32 may then be at least partially retracted to allow the tool to be retracted or to allow the member 32 to be further advanced along the groove 44 or be moved to another groove 44 or other receiving element 34.

In the embodiments shown in FIGS. 2-4, the groove 44 defines a path that extends in both an axial and horizontal or azimuthal direction. For example, the grooves 44 are shown as extending in a spiral path along the interior surface of the casing 36. The path may extend toward a single endpoint, or may include a plurality of seats to define a plurality of stop positions.

In one embodiment, groove 44 is recessed into casing so that other tools or downhole carriers can be lowered into the borehole without requiring reconfiguration or removal of any components. Because the receiving elements 34 are fixedly disposed in the casing 36 or other fixed component, the tool 20 can be repeatedly positioned in the same position and/or additional tools can be disposed in the same position. The tool can thus occupy the same station and at different times in a well.

In one embodiment, the groove 44 includes a guide portion 48 configured to guide or direct the extendable member 32 into engagement with the receiving element. An example of the guide portion 48 is shown in FIG. 4, which is a recessed area in the casing having a greater width than the groove 44. The width of the guide portion decreases as it approaches the groove 44 and the sides of the guide portion 48 act to urge the member 32 to the groove 44. The guide portion 48 may have a substantially constant depth in the casing corresponding to the depth of the groove 44, or may have a gradually increasing depth as the guide portion 48 approaches the groove 44. Although a single guide portion is shown, other embodiments may include multiple guide portions associated with each groove 44 or other receiving element 34.

One embodiment of a method 50 of disposing a tool or carrier in a downhole location and/or estimating a geology of an earth formation is shown in FIG. 4. The method 50 includes one or more stages 51-55. In one embodiment, the method 50 includes the execution of all of stages 51-55 in the order described. However, certain stages may be omitted, stages may be added, or the order of the stages changed.

Figure 5:
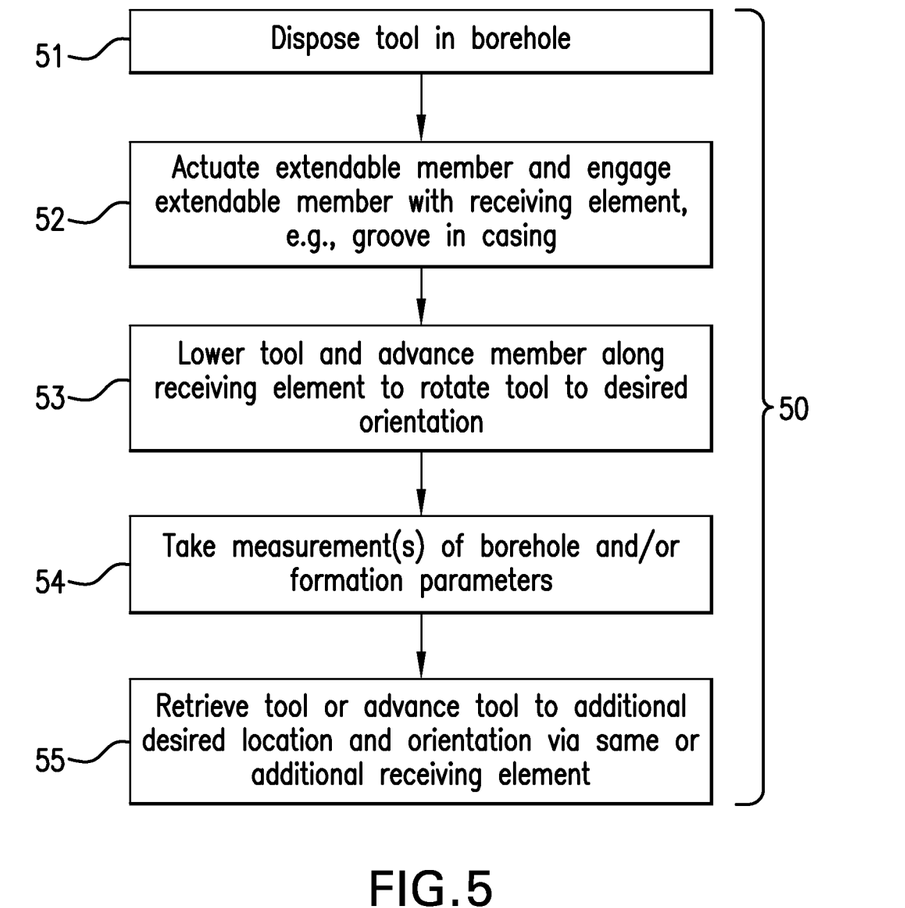
FIG. 5 is a flow chart illustrating an embodiment of a method of positioning a tool and/or measuring parameters of an earth formation.

In the first stage 51, a measurement apparatus such as the tool 20 is disposed in the borehole 12. The apparatus may be lowered into the borehole via any suitable conveyance, such as the borehole string 11 or a wireline.

In the second stage 52, the tool is positioned at some location above or below the desired measurement location and orientation, and the assembly 30 is controlled to actuate the member 32 and extend the member 32 at least partially from the outer surface of the tool 20. For example, the member 32 is actuated and biased radially outwardly so that the member 32 is in contact with the casing 36. The tool 20 is then rotated and/or moved axially. When the member 32 is moved over the grove 44 or the guide portion 48, the member 32 extends further outward and engages the guide portion 48 or groove 44. At this point, the member 32 may come into contact with a side of the groove 44 or guide portion 48 and cause resistance. In one embodiment, a sensor, such as a tension sensor connected to the member 32 or a structure such as the biasing member 42, is used to determine when the member 32 engages the groove or staring point.

In one embodiment, a location mechanism may be used to aid in locating the position of the member 32, the receiving section 48 and/or the tool orientation. For example, physical markers on the string can be located on an azimuthal position of the tool string and/or casing near the surface to allow an operator to generally or approximately align the member 32 to some point on the groove 44 or the guide portion 48. Such markers can be used to help guide the member to the groove 44. Other types of location mechanisms may also be used, such as a radio frequency identification (RFID) marker attached to or disposed near the member 32 and/or the groove 44.

In the third stage 53, the tool 20 is lowered or raised and the member 32 advances along the groove 44. Optionally, the member 32 is locked in the actuated position via the locking mechanism 43. As the tool 20 is lowered, the member 32 moves along the groove 44 and rotates the tool 20 as the member 32 advances. The tool 20 is lowered until the member engages a seat 46 and resistance is encountered. At this point, the tool 20 is positioned at a desired depth and orientation (corresponding to the seat location) for measurement.

In the fourth stage 54, the tool is activated to take one or more measurements of the borehole 14 and/or the formation 16. For example, directional gravitational measurements are taken to determine formation parameters.

In the fifth stage 55, the member 32 is at least partially withdrawn and the tool 20 is retrieved or advanced further along the borehole 14. In one embodiment, the member 32 is fully withdrawn and the tool is repositioned to a second depth approximately located near another groove 44 or guide portion 48 and the tool 20 is positioned as described in stage 42.

In one embodiment, the member 32 is partially withdrawn and/or the locking mechanism 43 is disengaged, and the tool is moved axially (e.g., lowered, raised or otherwise advanced along the borehole) to advance the member 32 further along the groove 44. The member 32 again extends to a fully extended position (e.g., via a biasing member or the actuator 38), the locking mechanism 43 is optionally engaged, and the tool 20 is lowered to advance the member 32 until it contacts or otherwise engages another seat 46.

The method 50 may be repeated until measurements are performed at all desired locations. The method 50 may be performed repeatedly by locating the tool at multiple desired positions. In one embodiment, multiple tools can be located at respective desired positions, either sequentially or simultaneously.

Other exemplary methods may be used to temporarily place self-contained gravity meters into known locations within a producing well. In this embodiment the sensor package is self-contained and records data into memory and might be retrieved after a few hours or days.

In one embodiment, the systems described herein are used in a calibration procedure or method, e.g., for in situ calibration of a downhole tool. For example, a number of seats 46 are positioned along the groove 44 at locations corresponding to a fixed tool rotational position (e.g., a fixed number of degrees of rotations), or the receiving element 34 otherwise includes a number of structures configured to engage the extendable member 32 at fixed orientations. At each location, a measurement is performed and compared to a known value corresponding to that location. Differences between measured values and known values can be used to calibrate the downhole tool.

As the seats are fixedly located in the well, measurements can be repeated at multiple locations and measurements can be taken at different times at the same location. By using the systems and methods described herein, measurement tools can be accurately located for each measurement so that changes in formation properties can be effectively assessed. The systems and methods described herein address challenges in prior art methods of obtaining repeat gravity data, which typically introduce errors in the gravity measurement of about 0.3 microgal/mm.

Common prior art depth control mechanisms include meter wheels and pip tags inserted into a tool body or connectors. Absolute depth control for wireline tools is typically only good to 1 ft/1000 ft. Relative depth control, i.e., relative measurement of one depth to another in a well, may be somewhat better, but prior art relative measurements cannot be used to relocate a borehole gravity tool well enough for meaningful comparison of repeat borehole gravity surveys. The systems and methods described herein overcome such prior art limitations.

For example, the methods described herein provide a mechanism for running a high precision borehole gravity meter into producing wells in a field at different times to map changes in borehole gravity. The change in gravity is attributed to changes in mass distribution in the field, and the largest changes can be associated with the replacement of oil with gas or gas with water. Changes in oil mass are also evident in the gravity field. The required measurements are very high precision and it is desirable to make time-lapse measurements at precisely the same location within each well. The method described herein causes the measurement tool to be forced to rotate into a predefined orientation, which minimizes the difference in depth at which the time-lapse gravity measurement is made and ensures that the tool is oriented as on previous measurements. In addition, the methods and systems described herein provide a mechanism for properly orienting measurement tools even in tools that are eccentrically positioned within a borehole.

In addition, it should be noted that tool or "string" as used herein, refers to any structure or carrier suitable for lowering a tool through a borehole and is not limited to the structure and configuration described herein. For example, the string 12 is configured as a hydrocarbon production string or formation evaluation string. Furthermore, the measurement devices and positioning assemblies are not limited to the configurations described herein and may be disposed in any suitable carrier. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes and downhole subs.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A downhole positioning apparatus comprising:
a carrier configured to be disposed in a borehole in an earth formation, the carrier including at least one measurement tool and an extendable member configured to be actuated between a first position in which the extendable member is disposed at the carrier, a second position in which the member is extended from an outer surface of the carrier, and an intermediate position in which the member is partially extended; and a receiving element fixedly disposed at a borehole casing and defining a path along a surface of the casing, the receiving element configured to receive the extendable member when the member is in the second position or the intermediate position and guide the carrier to a selected orientation as the carrier is moved axially through the borehole; and an actuator configured to move the extendable member between the first position, the second position and the intermediate position, and maintain the extendable member at the intermediate position as the extendable member is moved along the receiving element.

2. The apparatus of claim 1, wherein the receiving element is configured to advance the member along a path on an interior surface of the casing, the path having an axial component extending along a length of the borehole and a horizontal component.

3. The apparatus of claim 1, further comprising at least one seat disposed in a path defined by the receiving element, the seat configured to contact the member and impede movement of the member within the receiving element when the member is in the second position.

4. The apparatus of claim 3, wherein the at least one seat includes a plurality of seats disposed at a plurality of locking positions in the path, each seat configured to contact the member and impede movement of the member within the receiving element when the member is in the second position, each seat configured to allow the member to move past the seat when the member is in the intermediate position.

5. The apparatus of claim 4, wherein the actuator is configured to maintain the member at the intermediate position as the member is moved in the path toward a selected locking position, and move the member to the second position to engage the seat located at the selected locking position.

6. The apparatus of claim 4, wherein the seat is selected from an ending location of the recessed portion and a structure disposed along the path defined by the recessed portion.

7. The apparatus of claim 4, wherein the seat is a hole in the recessed portion defining a depth into the casing that is greater than a depth of the recessed portion, the hole having a shape configured to allow entry of a portion of the member therein.

8. The apparatus of claim 1, wherein the receiving element is a recessed portion defining a path along a surface of the casing.

9. The apparatus of claim 8, wherein the receiving element is an elongated groove defining a path along the surface of the casing.

10. The apparatus of claim 9, wherein the elongated groove defines a spiral path along the surface of the casing.

11. The apparatus of claim 4, wherein the plurality of seats are located at different circumferential locations on the casing.

12. The apparatus of claim 1, wherein the measurement tool includes at least one of a directionally dependent measurement tool and a directional gravity sensing device.

13. A method of positioning a downhole carrier, comprising:

disposing a carrier in a borehole in an earth formation, the carrier including at least one measurement tool and an extendable member;

actuating the extendable member from a first position in which the extendable member is disposed at the carrier to at least one of a second position in which the member is extended from an outer surface of the carrier and an intermediate position in which the member is partially extended;

engaging the extendable member with a receiving element fixedly disposed at a borehole casing, wherein engaging includes moving the extendable member by an actuator to the intermediate position so that a portion of the extendable member extends into the receiving element;

advancing the carrier along the borehole and moving the extendable member along the receiving element to a selected location in the receiving element corresponding to a selected depth and orientation of the carrier, the actuator maintaining the extendable member at the intermediate position as the receiving element guides the carrier to the selected orientation and the extendable member is moved along the receiving element; and moving the extendable member from the intermediate position to the second position to lock the extendable member in place.

14. The method of claim 13, wherein the receiving element is configured to advance the member along a path on an interior surface of the casing, the path having an axial component extending along a length of the borehole and a horizontal component.

15. The method of claim 13, wherein advancing the carrier includes moving the extendable member in the intermediate position along a path defined by the receiving element until the extendable member engages at least one seat disposed in the path.

16. The method of claim 15, wherein the at least one seat includes a plurality of seats disposed at a plurality of locking positions in the path, each seat configured to contact the member and impede movement of the member within the receiving element when the member is in the second position, each seat configured to allow the member to move past the seat when the member is in the intermediate position.

17. The method of claim 16, further comprising returning the member to the intermediate position and advancing the member in the intermediate position along the path to at least one additional seat disposed in the path, each additional seat corresponding to a selected depth and rotational orientation of the carrier.

18. The method of claim 13, wherein the receiving element is a recessed portion defining a path along a surface of the casing.

19. The method of claim 13, further comprising taking at least one measurement of an earth formation when the carrier is disposed at a depth and orientation defined by the receiving element.

20. The method of claim 13, further comprising retracting the extendable member to the first position, advancing the carrier along the borehole, engaging the member with an additional receiving element, and moving the member along the additional receiving element to a location corresponding to an additional selected depth and rotational orientation of the carrier.

* * * * *